United States Patent
Liu et al.

(10) Patent No.: US 9,917,509 B2
(45) Date of Patent: Mar. 13, 2018

(54) CHARGE PUMP CIRCUIT OUTPUTTING HIGH VOLTAGE WITHOUT HIGH VOLTAGE-ENDURANCE ELECTRIC DEVICES

(71) Applicant: HIMAX TECHNOLOGIES LIMITED, Tainan (TW)

(72) Inventors: Cheng-Chin Liu, Tainan (TW); Min-Hsueh Hsieh, Tainan (TW); Yung-Jie Luo, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 51 days.

(21) Appl. No.: 15/166,250

(22) Filed: May 26, 2016

(65) Prior Publication Data

US 2017/0346392 A1 Nov. 30, 2017

(51) Int. Cl.
*G05F 1/10* (2006.01)
*G05F 3/02* (2006.01)
*H02M 3/07* (2006.01)

(52) U.S. Cl.
CPC ..................... *H02M 3/07* (2013.01)

(58) Field of Classification Search
CPC .. H02M 3/073; H02M 3/07; H02M 2003/077; G11C 5/145; G05F 3/205
USPC .......................................................... 327/536
See application file for complete search history.

(56) References Cited

U.S. PATENT DOCUMENTS

| | | | | |
|---|---|---|---|---|
| 5,874,850 A | * | 2/1999 | Pulvirenti | H02M 3/073 307/110 |
| 6,525,949 B1 | * | 2/2003 | Johnson | H02M 3/073 363/60 |
| 6,897,708 B2 | * | 5/2005 | Hamasako | H02M 3/073 327/536 |
| 8,125,263 B2 | * | 2/2012 | Wu | H02M 3/073 327/536 |
| 2007/0001745 A1 | * | 1/2007 | Yen | H02M 3/07 327/536 |
| 2008/0116958 A1 | * | 5/2008 | Ko | H02M 3/073 327/536 |
| 2011/0285455 A1 | * | 11/2011 | Kok | H02M 3/073 327/536 |

(Continued)

FOREIGN PATENT DOCUMENTS

JP 2003284325 A * 10/2003
TW I434501 B 4/2014
TW I534785 B 5/2016

*Primary Examiner* — Quan Tra
(74) *Attorney, Agent, or Firm* — CKC & Partners Co., Ltd.

(57) ABSTRACT

The charge pump circuit includes multiple boosting stages, and each stage includes following units. A first switch circuit is controlled by a first clock signal to couple a second terminal of a first capacitor to a first input terminal or a second input terminal. A third switch circuit is controlled by a second clock signal to couple a second terminal of a second capacitor to the first input terminal or the second input terminal. A second switch circuit is controlled by electric potentials on the second capacitor to couple a first terminal of the first capacitor to the first input terminal or an output terminal. The fourth switch circuit is controlled by electric potentials on the first capacitor to couple a first terminal of the second capacitor to the first input terminal or the output terminal.

7 Claims, 7 Drawing Sheets

(56) References Cited

U.S. PATENT DOCUMENTS

| | | | |
|---|---|---|---|
| 2012/0169404 A1* | 7/2012 | Cook | H02M 3/07 327/536 |
| 2013/0294123 A1* | 11/2013 | Chuang | H02M 3/07 363/60 |
| 2015/0048743 A1 | 2/2015 | Liao et al. | |
| 2015/0263610 A1* | 9/2015 | Ferrant | H02M 3/073 327/536 |
| 2015/0303794 A1* | 10/2015 | Molin | H02M 3/07 327/536 |
| 2016/0005487 A1 | 1/2016 | Po | |

* cited by examiner

CHARGE PUMP CIRCUIT OUTPUTTING HIGH VOLTAGE WITHOUT HIGH VOLTAGE-ENDURANCE ELECTRIC DEVICES

BACKGROUND

Field of Invention

The present invention relates to a charge pump. More particularly, the present invention relates to the charge pump using low voltage-endurance electric devices to output high voltage.

Description of Related Art

A charge pump is used to transform a low voltage into a high voltage. A common type of the charge pump is a switched capacitor (SC) based charge pump which includes one or more capacitors and metal oxide semiconductor field effect transistors (MOSFET). The high voltage is outputted through charging and discharging of the capacitors in the SC based charge pump. In some applications, the output voltage may be several times higher than the input voltage so that the voltage-endurance of the MOSFET or the capacitors are required to be high. For example, the high voltage with 15 volts may be required in a crystal display panel. However, the cost of electric devices with high voltage-endurance is high. Therefore, it is an issue concerned by people in the art for the high voltage-endurance problem.

SUMMARY

Embodiments of the present disclosure provide a charge pump circuit including multiple boosting stages. Each of the boosting stages has an input dock terminal, a first input terminal, a second input terminal, an output clock terminal and an output terminal. Each of the boosting stages includes at least one boosting circuit, and the boosting circuit includes a first capacitor, a second capacitor, a first switch circuit, a second switch circuit, a third switch circuit and a fourth switch circuit. The first capacitor has a first terminal and a second terminal. The first switch circuit is coupled to the second terminal of the first capacitor, the first input terminal and the second input terminal, and is controlled by a first clock signal from the input clock terminal to couple the second terminal of the first capacitor to the first input terminal or the second input terminal. The second switch circuit is coupled to the first terminal of the first capacitor, the first input terminal and the output terminal. The second capacitor has a first terminal and a second terminal. The third switch circuit is coupled to the second terminal of the second capacitor, the first input terminal and the second input terminal, and is controlled by a second clock signal from the input clock terminal to couple the second terminal of the second capacitor to the first input terminal or the second input terminal. The second clock signal is inverted from the first clock signal. The fourth switch circuit is coupled to the first terminal of the second capacitor, the first input terminal and the output terminal. The second switch circuit is controlled by electric potentials on the first terminal and the second terminal of the second capacitor to couple the first terminal of the first capacitor to the first input terminal or the output terminal. The fourth switch circuit is controlled by electric potentials on the first terminal and the second terminal of the first capacitor to couple the first terminal of the second capacitor to the first input terminal or the output terminal.

In some embodiments, in a first phase, the first switch circuit couples the second terminal of the first capacitor to the second input terminal, the second switch circuit couples the first terminal of the first capacitor to the first input terminal, the third switch circuit couples the second terminal of the second capacitor to the first input terminal, and the fourth switch circuit couples the first terminal of the second capacitor to the output terminal. During a second phase, the first switch circuit couples the second terminal of the first capacitor to the first input terminal, the second switch circuit couples the first terminal of the first capacitor to the output terminal, the third switch circuit couples the second terminal of the second capacitor to the second input terminal, and the fourth switch circuit couples the first terminal of the second capacitor to the first input terminal.

In some embodiments, the second switch circuit includes following unit. A first switch has a first terminal coupled to the first terminal of the first capacitor, a second terminal coupled to the first input terminal, and a control terminal coupled to the second terminal of the second capacitor. A second switch has a first terminal coupled to the first terminal of the first capacitor, a second terminal coupled to the output terminal, and a control terminal coupled to the first terminal of the second capacitor.

In some embodiments, the fourth switch circuit includes following units. A third switch has a first terminal coupled to the first terminal of the second capacitor, a second terminal coupled to the first input terminal, and a control terminal coupled to the second terminal of the first capacitor. A fourth switch has a first terminal coupled to the first terminal of the second capacitor, a second terminal coupled to the output terminal, and a control terminal coupled to the first terminal of the first capacitor.

In some embodiments, the first switch circuit includes a fifth switch and a sixth switch. The fifth switch has a first terminal coupled to the second input terminal, a second terminal coupled to the second terminal of the first capacitor, and a control terminal coupled to the first clock signal. The sixth switch has a first terminal coupled to the first input terminal, a second terminal coupled to the second terminal of the first capacitor, and a control terminal coupled to the first clock signal. The third switch circuit includes a seventh switch and an eighth switch. The seventh switch has a first terminal coupled to the second input terminal, a second terminal coupled to the second terminal of the second capacitor, and a control terminal coupled to the second clock signal. The eighth switch has a first terminal coupled to the first input terminal, a second terminal coupled to the second terminal of the second capacitor, and a control terminal coupled to the second clock signal.

In some embodiments, the first switch, the third switch, the fifth switch and the seventh switch are N-type metal oxide semiconductor field-effect transistors (MOSFET). The second switch, the fourth switch, the sixth switch and the eighth switch are P-type MOSFET.

In some embodiments, the charge pump circuit further includes a third capacitor and a fourth capacitor. The third capacitor has a first terminal coupled to the second terminal of the first capacitor, and a second terminal coupled to a gate of the third switch. The fourth capacitor has a first terminal coupled to a gate of the first switch, and a second terminal coupled to the second terminal of the second capacitor.

In some embodiments, the output clock terminal is coupled between the fourth capacitor and the first switch.

In some embodiments, the boosting stages includes an $i^{th}$ boosting stage and an $(i-1)^{th}$ boosting stage, where i is a positive integer greater than 1. The input clock terminal of the $i^{th}$ boosting stage is coupled to the output clock terminal of the $(i-1)^{th}$ boosting stage. The first input terminal of the $i^{th}$ boosting stage is coupled to the output terminal of the $(i-1)^{th}$ boosting stage. The second input terminal of the $i^{th}$ boosting stage is coupled to the first input terminal of the $(i-1)^{th}$ boosting stage.

From another aspect of the present disclosure, a display panel including the char pump circuit is provided.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence. In addition, the "couple" used in the specification should be understood for electrically connecting two units directly or indirectly. In other words, when "a first object is coupled to a second object" is written in the specification, it means another object may be disposed between the first object and the second object.

Figure 1:
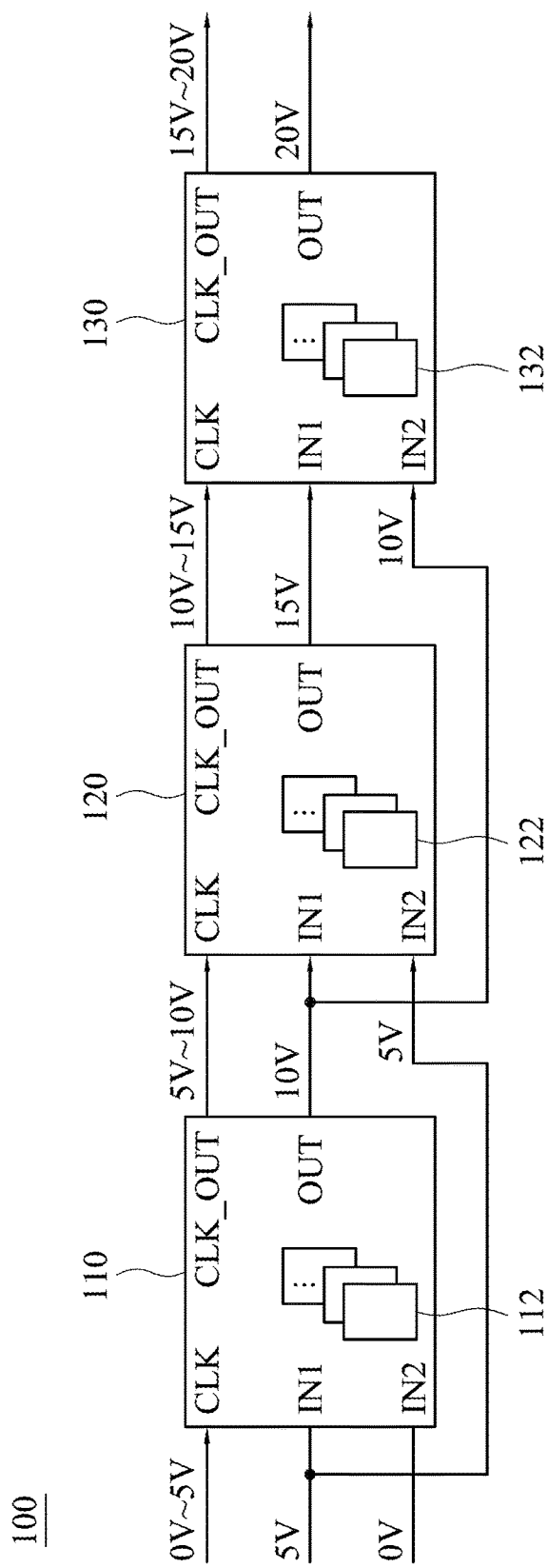
FIG. 1 is a circuit diagram illustrating a charge pump circuit according to an embodiment.

FIG. 1 is a circuit diagram illustrating a charge pump circuit according to an embodiment. Referring to FIG. 1, a charge pump circuit 100 includes boosting stages 110, 120, and 130. Each of the boosting stages 110, 120, and 130 has an input clock terminal CLK, a first input terminal IN1, a second input terminal IN2, an output clock terminal CLK_OUT and an output terminal OUT. The boosting stages 110, 120, and 130 are connected in series. To be specific, the input clock terminal CLK of an $i^{th}$ boosting stage (e.g. the boosting stage 120) is coupled to the output clock terminal CLK_OUT of an $(i-1)^{th}$ boosting stage (e.g. the boosting stage 110); the first input terminal IN1 of the $i^{th}$ boosting stage is coupled to the output terminal OUT of the $(i-1)^{th}$ boosting stage; the second input terminal IN2 of the $i^{th}$ boosting stage is coupled to the first input terminal IN1 of the $(i-1)^{th}$ boosting stage, where i is a positive integer greater than 1. Three boosting stages are disposed in the embodiment of FIG. 1, but the number of the boosting stages is not limited in the invention.

Each of the boosting stages 110, 120, and 130 slightly increases the voltage on the output terminal OUT at the previous stage, and thus a high voltage is outputted at the last stage. For example, at the boosting stage 110, the voltage on the first input terminal IN1 is 5 volts (V), the voltage on the second input terminal IN2 is 0V, a clock signal on the input clock terminal CLK is between 0V to 5V, the voltage on the output terminal OUT is 10V, and a clock signal on the output clock terminal CLK_OUT is between 5V to 10V. At the boosting stage 120, the voltage on the output terminal OUT is 15V, and a clock signal on the output dock terminal CLK_OUT is between 10V to 15V. At the boosting stage 130, the voltage on the output terminal OUT is 20V, and a clock signal on the output clock terminal CLK_OUT is between 15V to 20V. However, the values discussed above are just examples, and the invention is not limited thereto.

Figure 2:
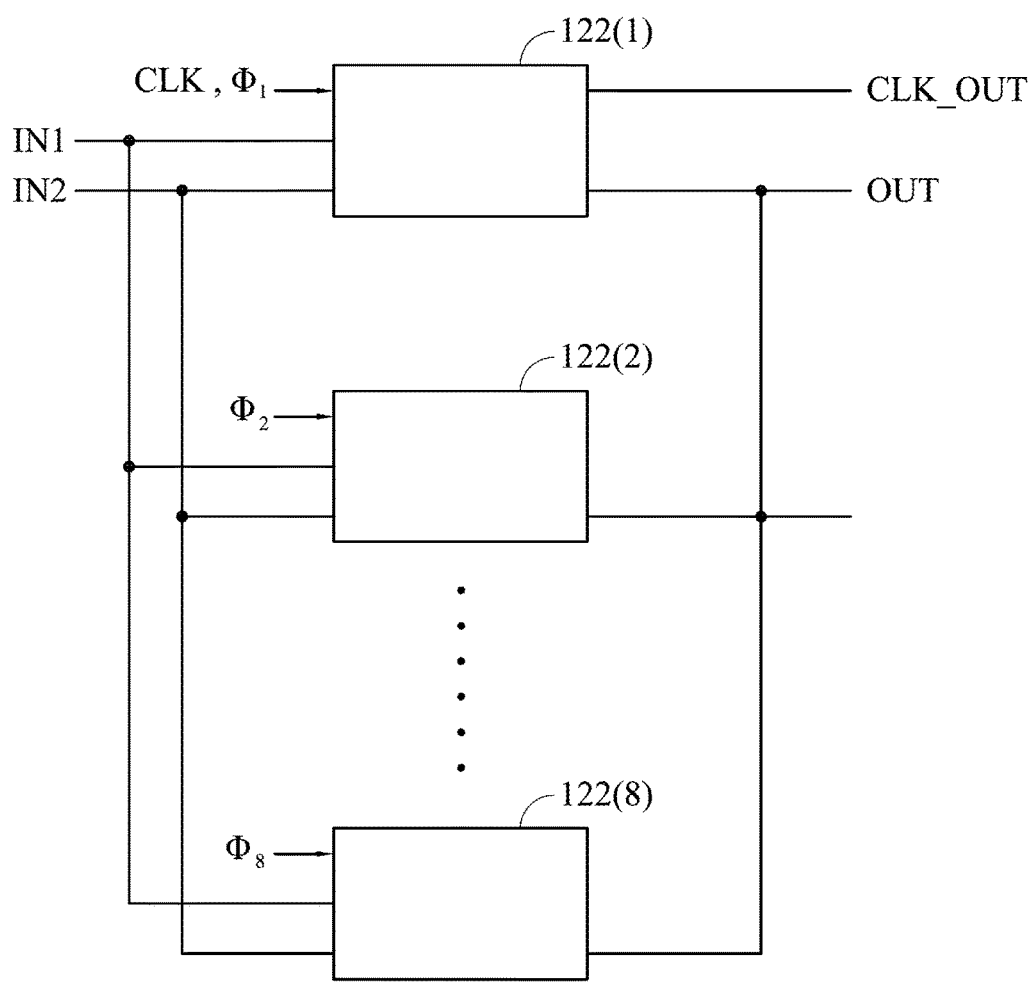
FIG. 2 is a circuit diagram illustrating the boosting circuits in one boosting stage according to an embodiment.
Figure 3:
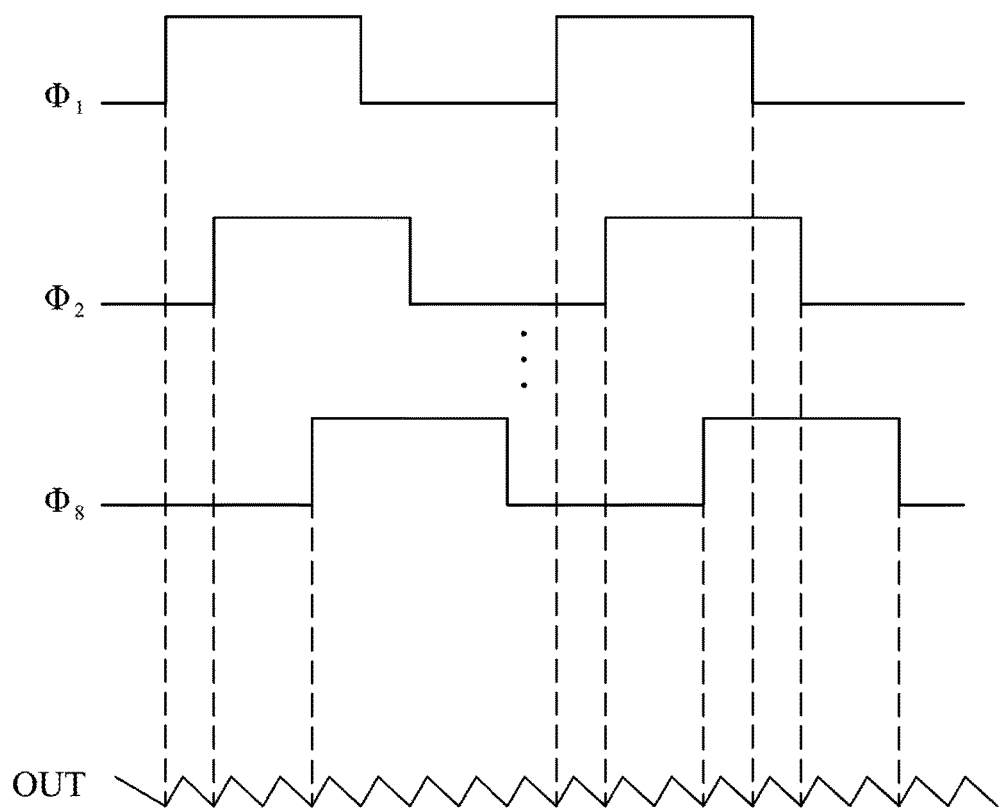
FIG. 3 is a diagram illustrating waveforms of the clock signals and the signal on the output terminal.

Each boosting stage includes at least one boosting circuit. For example, the boosting stage 110 has at least one boosting circuit 112, the boosting stage 120 has at least one boosting circuit 122, and the boosting stage 130 has at least one boosting circuit 132. Take the boosting circuit 122 as an example, when more than one boosting circuits 122 are disposed, these boosting circuits 122 are connected with each other in parallel, and are driven by clock signals with different phases. FIG. 2 is a circuit diagram illustrating the boosting circuits in one boosting stage according to an embodiment. Referring to FIG. 2, eight boosting circuits 122(1), 122(2) . . . 122(8) are disposed in the boosting stage 120, and they are driven by clock signals $\Phi_1, \Phi_2, \ldots \Phi_8$ respectively. Each boosting circuit 122(1), 122(2) . . . 122(8) is coupled to the first input terminal IN1, the second input terminal IN2 and the output terminal OUT of the boosting stage 120. FIG. 3 is a diagram illustrating waveforms of the clock signals and the signal on the output terminal. Referring to FIG. 3, the clock signal $\Phi_1$ is obtained from the input clock terminal CLK, and the clock signal $\Phi_2$ is generated by delaying the clock signal $\Phi_1$, and so on. The voltage on the output terminal OUT is pulled high at raising edges and falling edges of the clock signals $\Phi_1, \Phi_2 \ldots \Phi_8$. A stable voltage is outputted through the parallel connection of the boosting circuits 122(1), 122(2) . . . 122(8).

There are eight boosting circuits 122(1), 122(2) . . . 122(8) in the embodiment of FIG. 3. However, more or less boosting circuits 122 may be disposed in another embodiment. The boosting circuit 122(1) is taken as an example for description below, and the description for the other boosting circuits will not be repeated.

Figure 4:
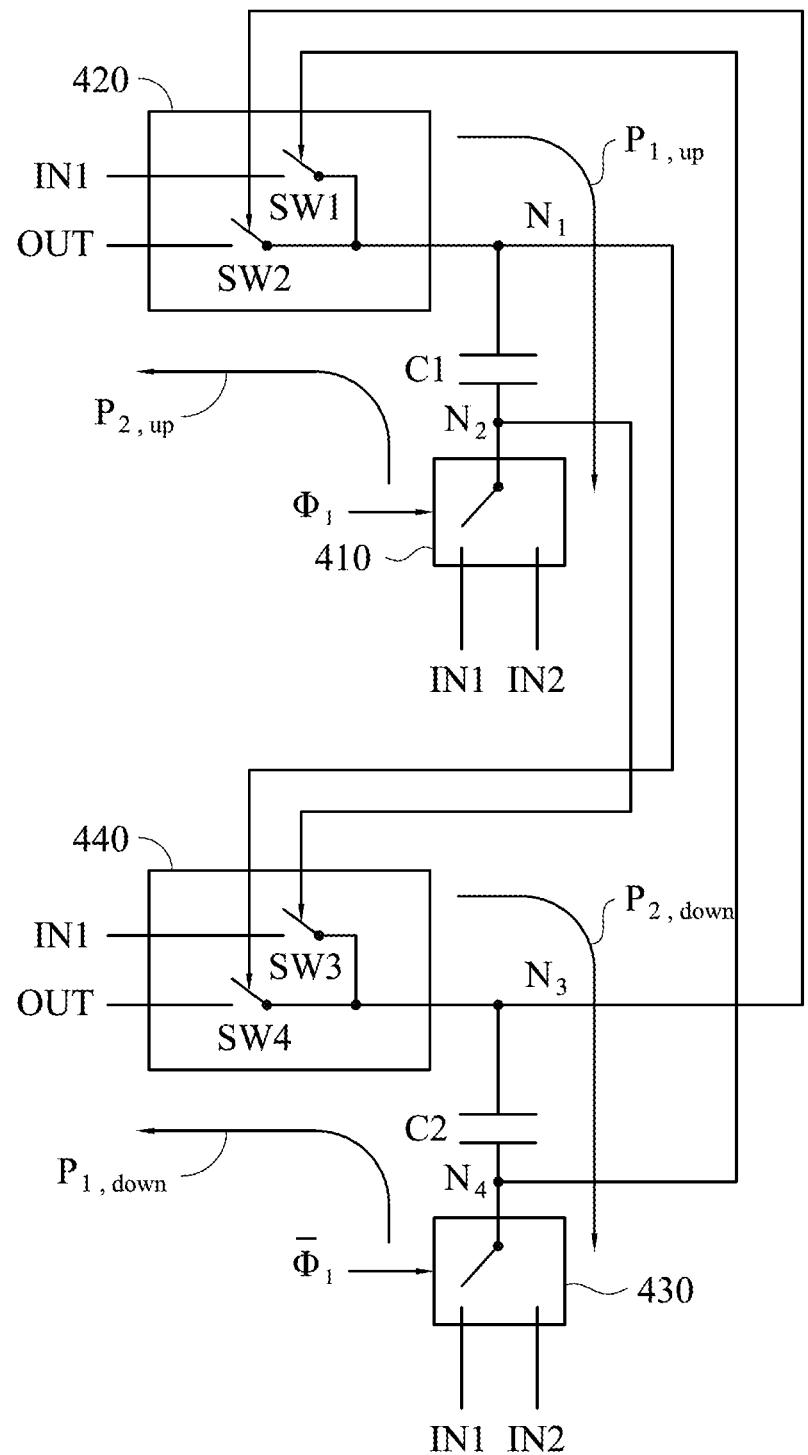
FIG. 4 is a circuit diagram illustrating the boosting circuit according to an embodiment.

FIG. 4 is a circuit diagram illustrating the boosting circuit according to an embodiment. Referring to FIG. 4, the boosting circuit 122(1) includes a first capacitor C1, a second capacitor C2, a first switch circuit 410, a second switch circuit 420, a third switch circuit 430 and a fourth switch circuit 440. The first capacitor C1 has a first terminal $N_1$ and a second terminal $N_2$, and the second capacitor has a first terminal $N_3$ and a fourth terminal $N_4$. The first switch circuit 410 is coupled to the second terminal $N_2$ of the first capacitor C1, the first input terminal IN1 and the second input terminal IN2, and is controlled by the first clock signal $\Phi_1$ to couple the second terminal $N_2$ of the first capacitor C1 to the first input terminal IN1 or the second input terminal IN2. The second switch circuit 420 is coupled to the first terminal $N_1$ of the first capacitor C1, first input terminal IN1 and the output terminal OUT, and is controlled by electric potentials on the first terminal $N_3$ and the second terminal $N_4$ of the second capacitor C2 so as to couple the first terminal $N_1$ of the first capacitor C1 to the first input terminal IN1 or the output terminal OUT. The third switch circuit 430 is coupled to the second terminal $N_4$ of the second capacitor C2, the first input terminal IN1 and the second input terminal IN2, and controlled by a second clock signal $\overline{\Phi_1}$ so as to couple the second terminal $N_4$ of the second capacitor C2 to the first input terminal IN1 or the second input terminal IN2. The second clock signal $\overline{\Phi_1}$ is inverted from the first clock signal $\Phi_1$, and the second clock signal $\overline{\Phi_1}$ may be referred to "the first clock signal bar". The fourth switch circuit 440 is coupled to the first terminal $N_3$ of the second capacitor C2, the first input terminal IN1 and the output terminal OUT, and is controlled by electric potentials on the first terminal $N_1$ and the second terminal $N_2$ of the first capacitor C1 so as to couple the first terminal N3 of the second capacitor C2 to the first input terminal IN1 or the output terminal OUT.

For example, the voltage on the first input terminal IN1 is 10V, the voltage on the second input terminal IN2 is 5V. In a first phase (e.g., the first clock signal $\Phi_1$ is logical high, and the second clock signal $\overline{\Phi_1}$ is logical low), referring to a path $P_{1,up}$, the first switch circuit 410 couples the second terminal $N_2$ of the first capacitor C1 to the second input terminal IN2. The second switch circuit 420 couples the first terminal N1 of the first capacitor C1 to the first input terminal IN1. As a result, the first input terminal IN1 and the second input terminal IN2 charges the capacitor C1. On the other hand, referring to a path $P_{1,down}$, the third switch circuit 430 couples the second terminal $N_4$ of the second capacitor C2 to the first input terminal IN1, and the fourth switch circuit 440 couples the first terminal $N_3$ of the second capacitor C2 to the output terminal OUT. In a static state, the voltage on the first terminal $N_3$ of the second capacitor C2 is 10V in the previous phase, and therefore the first terminal $N_3$ would be pushed to 15V in the current phase, and 15V is outputted through the output terminal OUT.

In a second phase (e.g., the first clock signal $\Phi_1$ is logical low, and the second clock signal $\overline{\Phi_1}$ is logical high), referring to a path $P_{2,up}$, the first switch circuit 410 couples the second terminal $N_2$ of the first capacitor C1 to the first input terminal IN1, and the second switch circuit 420 couples the first terminal $N_1$ of the first capacitor C1 to the output terminal OUT, and thus 15V is outputted through the output terminal OUT. Referring to a path $P_{2,down}$, the third switch circuit 430 couples the second terminal $N_4$ of the second capacitor C2 to the second input terminal IN2, and the fourth switch circuit 440 couples the first terminal $N_3$ of the second capacitor C2 to the first input terminal IN1, and thus the second capacitor C2 is charged.

In more detail, the second switch circuit 420 includes a first switch SW1 and second switch SW2. The first switch SW1 has a first terminal coupled to the first terminal $N_1$ of the first capacitor C1, a second terminal coupled to first input terminal IN1, and a control terminal coupled to the second terminal $N_4$ of the second capacitor C2. The second switch SW2 has a first terminal coupled to the first terminal $N_1$ of the first capacitor C1, a second terminal coupled to the output terminal OUT, and a control terminal coupled to the first terminal $N_3$ of the second capacitor C2. It's worth mentioning that, referring to the path $P_{2,up}$, the voltage on the first terminal $N_1$ is 15V in the second phase, and the voltage on the control terminal of the second switch SW2 is 10V. Therefore, the voltage across the second switch SW2 is 5V, and thus no high voltage-endurance electric device is required to implement the second switch SW2.

Similarly, the fourth switch circuit 440 includes a third switch SW3 and a fourth switch SW4. The third switch SW3 has a first terminal coupled to the first terminal $N_3$ of the second capacitor C2, a second terminal coupled to first input terminal IN1, and a control terminal coupled to the second terminal $N_2$ of the first capacitor C1. The fourth switch SW4 has a first terminal coupled to the first terminal $N_3$ of the second capacitor C2, a second terminal coupled to the output terminal OUT, and a control terminal coupled to the first terminal $N_1$ of the first capacitor C1. Referring to the path $P_{1,down}$, the voltage on the first terminal $N_3$ is 15V in the first phase, and the voltage on the control terminal of the fourth switch SW4 is 10V. Therefore, the voltage across the fourth switch SW4 is 5V, and thus no high voltage-endurance electric device is required to implement the fourth switch SW4.

In some embodiments, the first switch circuit 410 to the fourth switch circuit 440 are implemented by MOSFET. Another embodiment is provided below.

Figure 5:
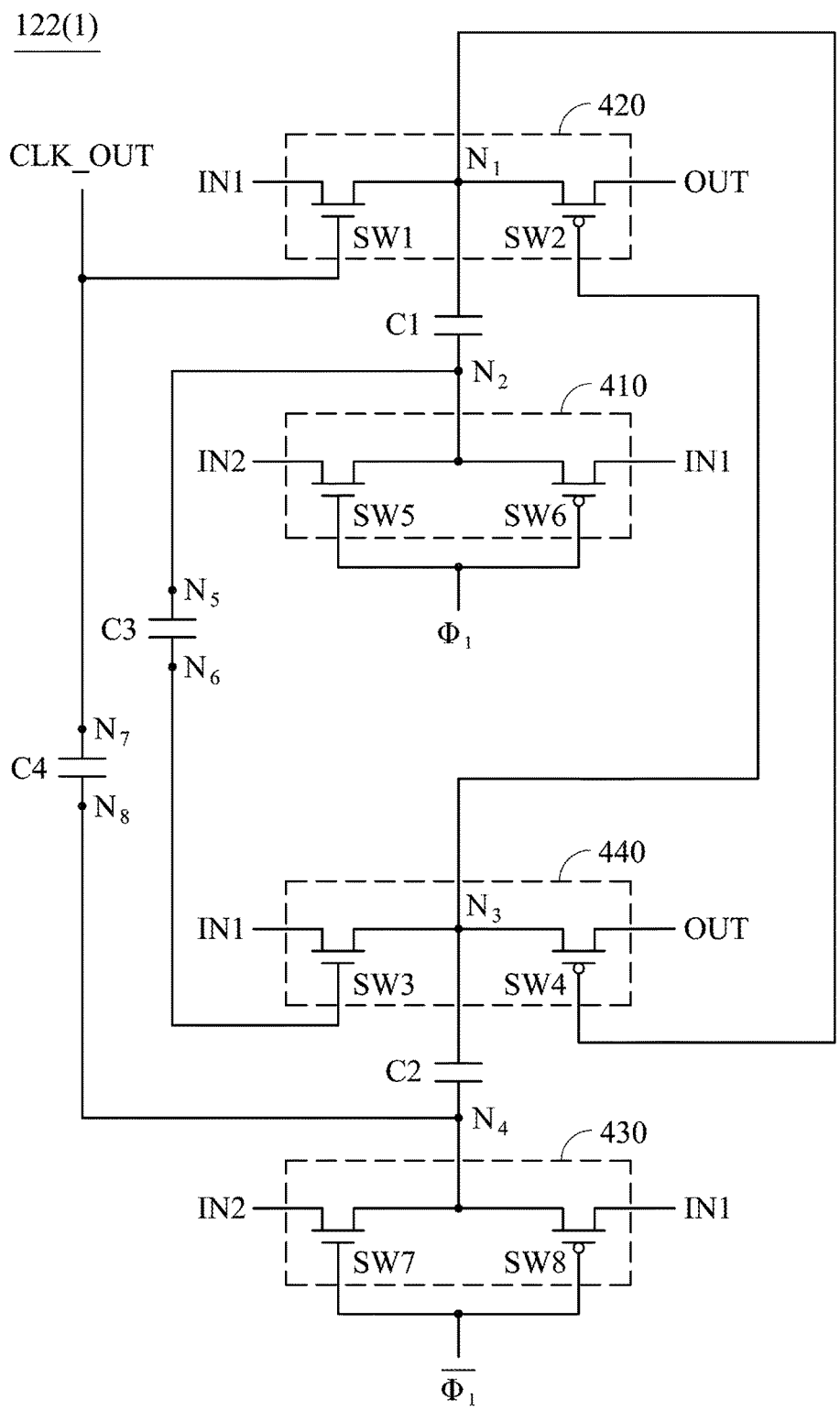
FIG. 5 is a circuit diagram illustrating the boosting circuit according to another embodiment.

FIG. 5 is a circuit diagram illustrating the boosting circuit according to another embodiment. Referring to FIG. 5, the first switch circuit 410 includes a fifth switch SW5 and a sixth switch SW6. The fifth switch SW5 has a first terminal coupled to the second input terminal IN2, a second terminal coupled to the second terminal $N_2$ of the first capacitor C1, and a control terminal coupled to first clock signal $\Phi_1$. The sixth switch SW6 has a first terminal coupled to the first input terminal IN1, a second terminal coupled to the second terminal $N_2$ of the first capacitor C1, and a control terminal coupled to the first clock signal $\Phi_1$. The third switch circuit 430 includes a seventh switch SW7 and an eighth switch SW8. The seventh switch SW7 has a first terminal coupled to the second input terminal IN2, a second terminal coupled to the second terminal $N_4$ of the second capacitor C2, and a control terminal coupled to the second clock signal $\overline{\Phi_1}$. The eighth switch SW8 has a first terminal coupled to the first input terminal IN1, a second terminal coupled to the second terminal $N_4$ of the second capacitor C2, and a control terminal coupled to the second clock signal $\overline{\Phi_1}$.

In the embodiment of FIG. 5, the first switch SW1, the third switch SW3, the fifth switch SW5 and the seventh switch SW7 are N-type MOSFET. The second switch SW2, the fourth switch SW4, the sixth switch SW6 and the eighth switch SW8 are P-type MOSFET. However, other electric devices may be used to implement the first switch circuit 410 to the fourth switch circuit 440 according to the disclosure discussed above.

In FIG. 5, the boosting circuit 122(1) further includes a third capacitor C3 and a fourth capacitor C4. The third capacitor C3 has a first terminal $N_5$ coupled to the second terminal $N_2$ of the first capacitor C1, a second terminal $N_6$ coupled to a gate of the third switch SW3. The fourth capacitor C4 has a first terminal $N_7$ coupled to a gate of the first switch SW1, and a second terminal $N_8$ coupled to the second terminal $N_4$ of the second capacitor C2. In addition, the output clock terminal CLK_OUT is coupled between the fourth capacitor C4 and the first switch SW1.

Figure 6:
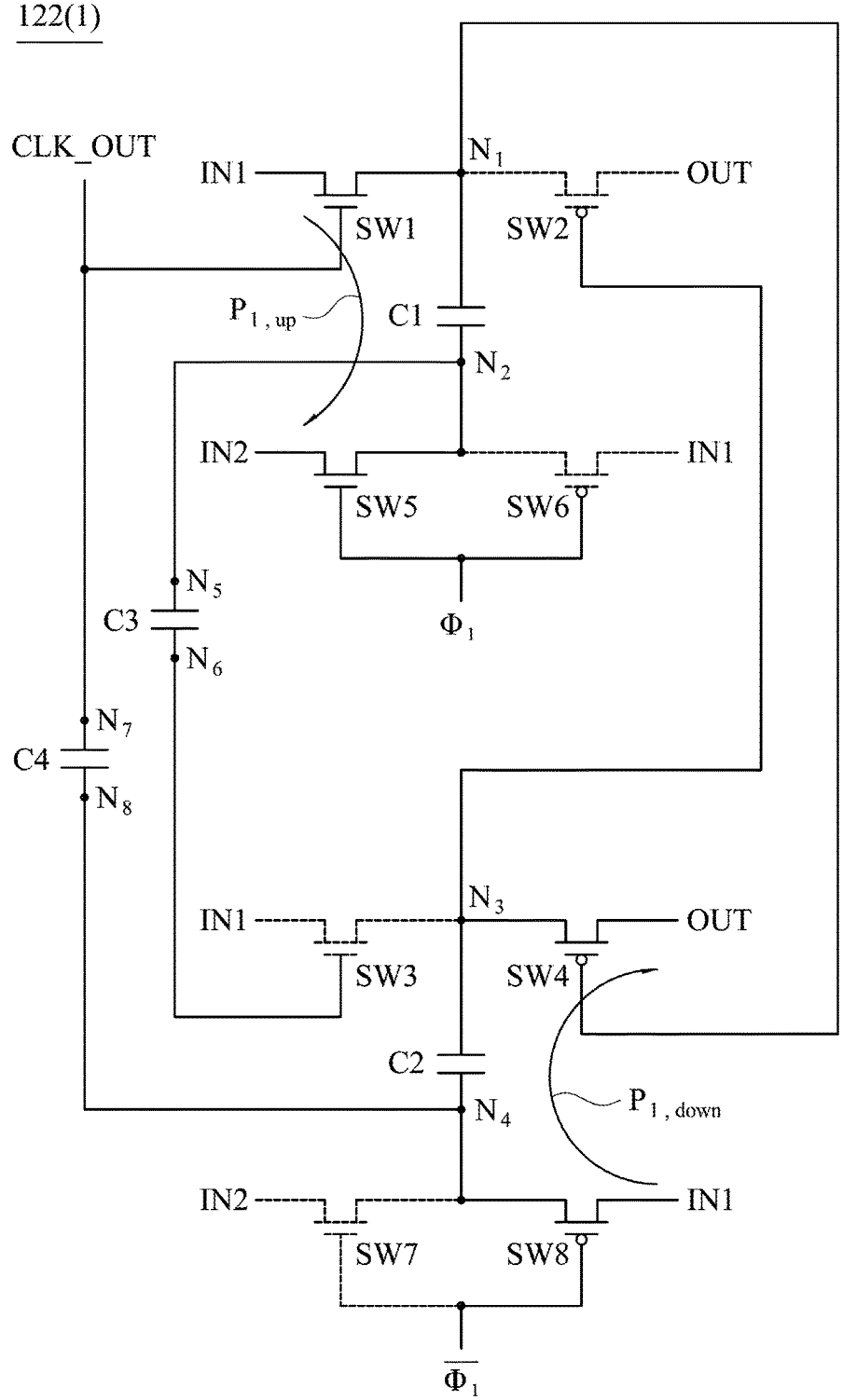
FIG. 6 is a diagram illustrating the operation of the boosting circuit of FIG. 5 in a first phase.

FIG. 6 is a diagram illustrating the operation of the boosting circuit of FIG. 5 in the first phase. In the embodiment of FIG. 6, the voltage on the first input terminal IN1 is 10V, and the voltage on the second input terminal IN2 is 5V. In the first phase, the first clock signal $\Phi_1$ is logical high (i.e. 10V), and thus the sixth switch SW6 is off, and the fifth switch SW5 is on. The voltage on the second terminal $N_4$ is 10V, and the voltage on the gate of the first switch SW1 is pushed to 15V through the coupling of the capacitor C4 in the static state. Therefore, the first switch SW1 is on. The voltage on the gate of the second switch SW2 is pushed to 15V, the voltage on the first terminal $N_1$ of the first capacitor C1 is 10V, and thus the second switch SW2 is off. Accordingly, the first input terminal IN1 and the second input terminal IN2 charges the first capacitor C1 through the path $P_{1,up}$. On the other hand, the second clock signal $\overline{\Phi_1}$ is logical low (i.e. 5V), and therefore the seventh switch SW7 is off, and the eighth switch SW8 is on. The voltage on the second terminal $N_2$ is 5V, and the voltage on the gate of the third switch SW3 is pulled down to 10V through the coupling of the third capacitor C3 in the static state. Therefore, the third switch SW3 is off. The voltage on the gate of the fourth switch SW4 is 10V, the voltage on the first terminal $N_3$ is pushed to 15V, and therefore the fourth switch SW4 is on. Accordingly, the output terminal OUT outputs 15V through the path $P_{1,down}$.

Figure 7:
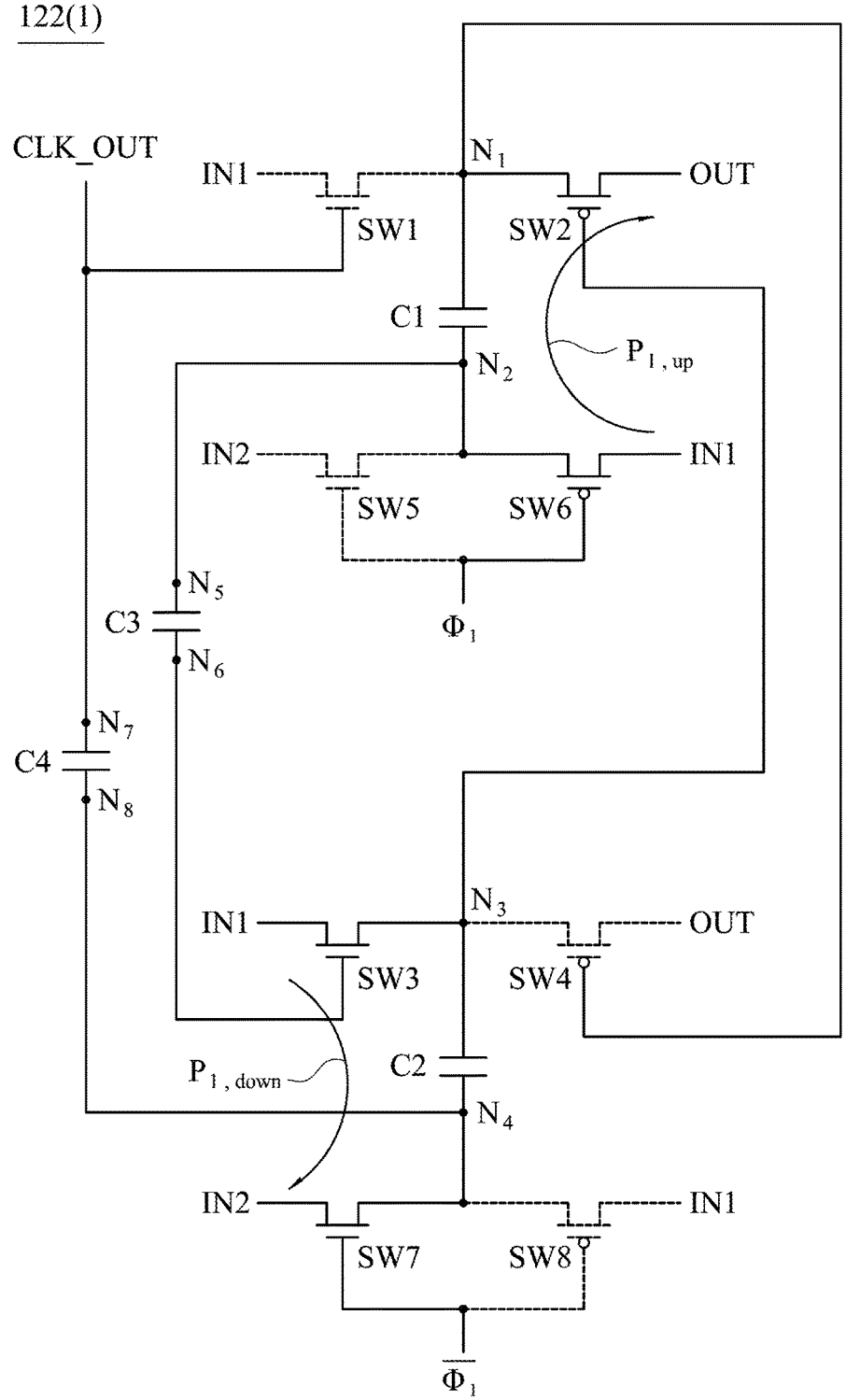
FIG. 7 is a diagram illustrating the operation of boosting circuit of FIG. 5 in a second phase.

FIG. 7 is a diagram illustrating the operation of boosting circuit of FIG. 5 in the second phase. Referring to FIG. 7, in the second phase, the second clock signal $\overline{\Phi_1}$ is logical high (i.e. 10V), and therefore the seventh switch SW7 is on, and the eighth switch SW8 is off. The voltage on the second terminal $N_2$ of the first capacitor C1 is 10V, and the gate of the third switch SW3 is pushed to 15V through the coupling of the third capacitor C3 in the static state. Therefore, the third switch SW3 is on. The voltage on the gate of the fourth switch SW4 is pushed to 15V, the voltage on the first terminal $N_3$ of the second capacitor C2 is 10V, and thus the fourth switch SW4 is off. Accordingly, the first input terminal IN1 and the second input terminal IN2 charge the second capacitor C2 through the path $P_{2,down}$. On the other hand, the first clock signal $\Phi_1$ is logical low (i.e. 5V), and therefore the sixth switch SW6 is on, and the fifth switch SW5 is off. The voltage on the second terminal $N_4$ of the second capacitor C2 is 5V, and the gate of the first switch SW1 is pulled down to 10V through the coupling of the capacitor C4 in the static state. Therefore, the first switch SW1 is off. The voltage on the gate of the second switch SW2 is 10V, and the voltage on the first terminal $N_1$ of the first capacitor C1 is pushed to 15V. Therefore, the second switch SW2 is on. The output terminal OUT outputs 15V through the path $P_{2,up}$.

In the operations of FIG. 6 and FIG. 7, the voltages across the first switch SW1 to the eighth switch SW8, and the capacitor C1 to the capacitor C4 are not over 5V, and thus these switches and capacitors are not required to have high voltage-endurance. On the other hand, the voltage on the second terminal $N_2$ of the first capacitor C1 can be changed through the third capacitor C3 to turn on/off the third switch SW3, and thus no level shifter is required. Similarly, the voltage on the second terminal $N_4$ of the second capacitor C2 can be changed through the fourth capacitor C4 to turn on/off the first switch SW1, and thus no level shifter is required.

Referring to FIG. 1 again, the charge pump circuit 100 may be disposed in a display panel in some embodiments, and the high voltage outputted by the charge pump circuit 100 is used to drive a thin film transistor (TFT). However, in which electric device the charge pump circuit 100 is disposed is not limited in the invention.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A charge pump circuit, comprising:
   a plurality of boosting stages, wherein each of the boosting stages has an input clock terminal, a first input terminal, a second input terminal, an output clock terminal and an output terminal, and each of the boosting stages comprises at least one boosting circuit, and the at least one boosting circuit comprises:
   a first capacitor having a first terminal and a second terminal;
   a first switch circuit, coupled to the second terminal of the first capacitor, the first input terminal and the second input terminal, and controlled by a first clock signal from the input clock terminal to couple the second terminal of the first capacitor to the first input terminal or the second input terminal;
   a second switch circuit, coupled to the first terminal of the first capacitor, the first input terminal and the output terminal;
   a second capacitor having a first terminal and a second terminal;
   a third switch circuit, coupled to the second terminal of the second capacitor, the first input terminal and the second input terminal, and controlled by a second clock signal from the input clock terminal to couple the second terminal of the second capacitor to the first input terminal or the second input terminal, wherein the second clock signal is inverted from the first clock signal;
   a fourth switch circuit, coupled to the first terminal of the second capacitor, the first input terminal and the output terminal;
   a third capacitor, having a first terminal coupled to the second terminal of the first capacitor, and a second terminal coupled to the fourth switch circuit; and
   a fourth capacitor, having a first terminal coupled to the second switch circuit, and a second terminal coupled to the second terminal of the second capacitor,
   wherein the output clock terminal is coupled between the fourth capacitor and the second switch circuit,
   wherein the second switch circuit is controlled by electric potentials on the first terminal and the second terminal of the second capacitor to couple the first terminal of the first capacitor to the first input terminal or the output terminal,
   wherein the fourth switch circuit is controlled by electric potentials on the first terminal and the second terminal of the first capacitor to couple the first terminal of the second capacitor to the first input terminal or the output terminal,
   wherein the boosting stages comprises an $i^{th}$ boosting stage and an $(i-1)^{th}$ boosting stage, and i is a positive integer greater than 1,
   wherein the input clock terminal of the $i^{th}$ boosting stage is coupled to the output clock terminal of the $(i-1)^{t}$ boosting stage,
   wherein the first input terminal of the $i^{th}$ boosting stage is coupled to the output terminal of the $(i-1)^{t}$ boosting stage,
   wherein the second input terminal of the $i^{th}$ boosting stage is coupled to the first input terminal of the $(i-1)^{th}$ boosting stage.

2. The charge pump circuit of claim 1, wherein in a first phase, the first switch circuit couples the second terminal of the first capacitor to the second input terminal, the second switch circuit couples the first terminal of the first capacitor to the first input terminal, the third switch circuit couples the second terminal of the second capacitor to the first input terminal, and the fourth switch circuit couples the first terminal of the second capacitor to the output terminal, wherein in a second phase, the first switch circuit couples the second terminal of the first capacitor to the first input terminal, the second switch circuit couples the first terminal of the first capacitor to the output terminal, the third switch circuit couples the second terminal of the second capacitor to the second input terminal, and the fourth switch circuit couples the first terminal of the second capacitor to the first input terminal.

3. The charge pump circuit of claim 2, wherein the second switch circuit comprises:

a first switch, having a first terminal coupled to the first terminal of the first capacitor, a second terminal coupled to the first input terminal, and a control terminal coupled to the second terminal of the second capacitor; and a second switch, having a first terminal coupled to the first terminal of the first capacitor, a second terminal coupled to the output terminal, and a control terminal coupled to the first terminal of the second capacitor.

4. The charge pump circuit of claim 3, wherein the fourth switch circuit comprises:

a third switch, having a first terminal coupled to the first terminal of the second capacitor, a second terminal coupled to the first input terminal, and a control terminal coupled to the second terminal of the first capacitor; and a fourth switch, having a first terminal coupled to the first terminal of the second capacitor, a second terminal coupled to the output terminal, and a control terminal coupled to the first terminal of the first capacitor.

5. The charge pump circuit of claim 4, wherein the first switch circuit comprises:

a fifth switch, having a first terminal coupled to the second input terminal, a second terminal coupled to the second terminal of the first capacitor, and a control terminal coupled to the first clock signal; and a sixth switch, having a first terminal coupled to the first input terminal, a second terminal coupled to the second terminal of the first capacitor, and a control terminal coupled to the first clock signal, wherein the third switch circuit comprises:

a seventh switch, having a first terminal coupled to the second input terminal, a second terminal coupled to the second terminal of the second capacitor, and a control terminal coupled to the second clock signal; and an eighth switch, having a first terminal coupled to the first input terminal, a second terminal coupled to the second terminal of the second capacitor, and a control terminal coupled to the second clock signal.

6. The charge pump circuit of claim 5, wherein the first switch, the third switch, the fifth switch and the seventh switch are N-type metal oxide semiconductor field-effect transistors (MOSFET), and the second switch, the fourth switch, the sixth switch and the eighth switch are P-type MOSFET.

7. A display panel comprising the char pump circuit of claim 1.

* * * * *